No. 792,139. PATENTED JUNE 13, 1905.
A. A. KRAMER.
ANIMAL DIPPING TANK.
APPLICATION FILED JUNE 11, 1904.
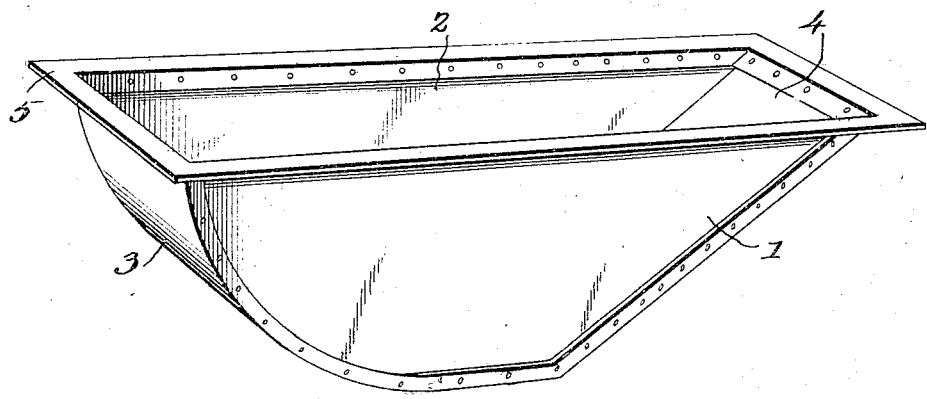
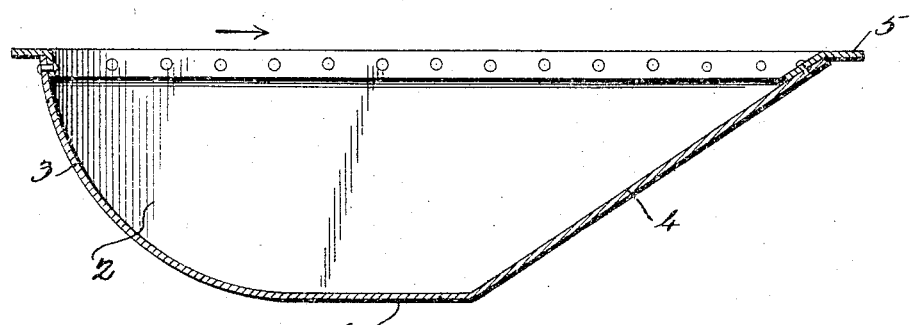
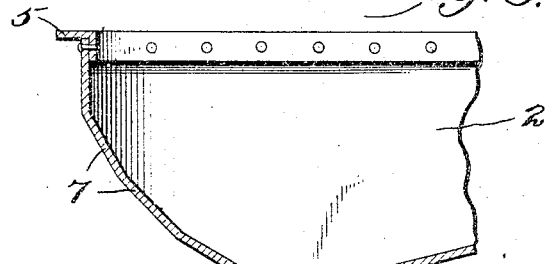
Witnesses
Andrew A. Kramer, Inventor.
Attorneys No. 792,139. Patented June 13, 1905.

UNITED STATES PATENT OFFICE.

ANDREW A. KRAMER, OF KANSAS CITY, KANSAS.

ANIMAL-DIPPING TANK.

SPECIFICATION forming part of Letters Patent No. 792,139, dated June 13, 1905.

Application filed June 11, 1904. Serial No. 212,159.

*To all whom it may concern:*

Be it known that I, ANDREW A. KRAMER, a citizen of the United States, residing at Kansas City, in the county of Wyandotte and State of Kansas, have invented a new and useful Animal-Dipping Tank, of which the following is a specification.

This invention relates to dipping-tanks, such as are commonly included in the paths or runways leading from pens to a slaughter-house, shearing-station, and the like, and are designed to contain a liquid solution through which the animals are compelled to pass. Ordinarily such tanks have abrupt upright ends at the entrances thereof, thereby resulting in quick and violent precipitation of the animals into the tank, frequently resulting in the breaking of the legs of the animals and also causing them to become turned over in the liquid, and thereby drowned.

In view of the objections above noted it is the purpose of the present invention to provide certain improvements in dipping-tanks for stock, whereby each animal will be slid gradually into the tank without danger of being turned over therein and without liability of breaking the legs of the animal, while at the same time preserving the general form and characteristics of this class of dipping-tanks in order that the present form of tank may be fitted in the ordinary runways without requiring any alterations or changes therein.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the accompanying drawings, Figure 1 is a perspective view of a stock-dipping tank embodying the features of the present invention. Fig. 2 is a vertical longitudinal sectional view thereof. Fig. 3 is a detail sectional view showing a modification of the invention.

Like characters of reference designate corresponding parts in each and every figure of the drawings.

The present tank will ordinarily be formed of sheet metal, preferably galvanized, and includes spaced longitudinal side walls 1 and 2 and front and rear ends 3 and 4, respectively, the top of the tank being wholly and constantly open and provided with an outwardly-directed peripheral flange 5 for convenience in supporting the tank in a runway. The front end 3 of the tank is at the entrance thereto and inclines downwardly and forwardly into the flat bottom 6 of the tank, from the rear end of which the rear end wall 4 of the tank inclines upwardly and outwardly or rearwardly, so as to constitute an exit-chute. The form of tank shown in Figs. 1 and 2 has the entrance end or entrance-chute portion 3 bowed, so as to be concaved upon the inner side of the tank, while the form shown in Fig. 3 is provided with a series of flat faces 7, approximating an arc and having all of the functions and advantages of the bowed or arcuate end 3.

When in use, the present tank is let in flush with the floor of a runway leading from a tank to a slaughter-house, shearing-station, or the like, the flange 5 being secured to the floor, so as to support the top of the tank flush with the top of the floor, the body of the tank of course hanging below the floor. Preparatory to using the tank a liquid solution of any approved or preferred form is placed in the tank, and then the animals are driven from the pen into the runway, the tank being disposed to have the animals pass thereacross in the direction of the arrow on Fig. 2. Upon reaching the entrance-pen 3 of the tank each animal gradually slides down the entrance-chute 3 and is thereby gradually deposited into the bath without liability of being turned over therein or having its legs broken by the fall. By reason of the gradual upward and rearward inclination of the exit-chute end 4 of the tank the animal may readily pass upwardly on said exit-chute and regain the floor of the runway and then pass on to the slaughter-house or other destination. It will of course be understood that the width of the tank approximates the width of the runway between the upright walls thereof in order that there may be no spaces at the side of the tank through which the animals may pass, and thereby avoid the bath, whereby each animal is compelled to pass through the tank, and thereby be subjected to the liquid solution contained in the tank.

In addition to the advantage of gradually sliding the animals into the tank without overturning the animals or otherwise endangering the same the downwardly-converged ends of the tank give the latter such a shape as to require somewhat less solution to obtain the desired depth than is necessary with the ordinary form of tanks, wherefore the present form of tank has an economical advantage, as well as the advantage of preventing injury to the animals.

Having fully described the invention, what is claimed is—

A stock-dipping tank having its top wholly and constantly open and provided with an external peripheral supporting-flange, the entrance end of the tank being bowed downwardly and forwardly from its top edge to the bottom of the tank, the inner face of said end being concaved and constituting an entrance-chute, and the rear end of the tank being inclined upwardly and rearwardly from the bottom of the tank to the top edge thereof and constituting an exit-chute.

In testimony that I claim the foregoing as my own I have hereto affixed my signature in the presence of two witnesses.

ANDREW A. KRAMER.

Witnesses:
   A. L. BOUDEN,
   H. A. STALEY.